United States Patent [19]
Ciminelli et al.

[11] Patent Number: 5,269,157
[45] Date of Patent: Dec. 14, 1993

[54] INSULATED BEACH BOX WITH UTILITY ATTACHMENTS

[76] Inventors: Michael Ciminelli; John A. Yapaola, both of Fairport, N.Y.

[21] Appl. No.: 959,806
[22] Filed: Oct. 13, 1992
[51] Int. Cl.$^5$ .............................................. F25D 3/08
[52] U.S. Cl. ................................ 62/457.7; 280/47.18; 297/193; 297/217
[58] Field of Search ................ 62/457.1, 457.2, 457.7, 62/529, 530, 371, 326, 331, 258; 297/192, 193, 217; 280/47.18

[56] References Cited

U.S. PATENT DOCUMENTS

| | | | |
|---|---|---|---|
| 3,050,280 | 8/1962 | Regan | 297/217 |
| 3,230,006 | 1/1966 | Sokolis | 297/193 X |
| 3,930,662 | 1/1976 | Manner | 297/39 X |
| 4,353,182 | 10/1982 | Junkas et al. | 297/193 X |
| 4,460,188 | 7/1984 | Maloof | 297/193 X |
| 4,652,048 | 3/1987 | Nazar | 297/192 |
| 4,724,681 | 2/1988 | Bartholomew et al. | 62/239 |
| 5,100,198 | 3/1992 | Baltzell | 297/192 |
| 5,184,477 | 2/1993 | Brown et al. | 62/457.7 |

*Primary Examiner*—Albert J. Makay
*Assistant Examiner*—William C. Doerrler
*Attorney, Agent, or Firm*—Jacobson, Price, Holman & Stern

[57] ABSTRACT

An insulated beach box in which ice, beverages and various other food products may be placed with the ice maintaining the beverages and food products at a cold and fresh condition even though the beach box is placed on the beach where it may be relatively hot. The beach box includes structural features and attachments which enables the box to be effectively used as a beach chair having a seat back pivotally connected thereto which forms a pull handle when oriented generally in perpendicular relation to the top of the box which forms a seat. The box includes wheels and a rounded corner surface generally in alignment with the seat back which enables the device to be easily pulled over a hard surface by using the wheels and over sand by using the curved corner and adjacent surfaces of the box to facilitate the beach box being pulled to a desired site. The seat back includes pockets for storage of various items and is pivotally supported from the box to enable the seat back to be pivoted forwardly to a generally horizontal position to enable the beach box to be carried by the use of end handles or stored. The seat back also provides an effective support for an optional umbrella which can be detachable clamped thereto and enables various other items that may be carried to or from the beach to be supported by placing them against the upper surface of the seat and the front surface of the seat back with such items being strapped in position if desired.

6 Claims, 1 Drawing Sheet

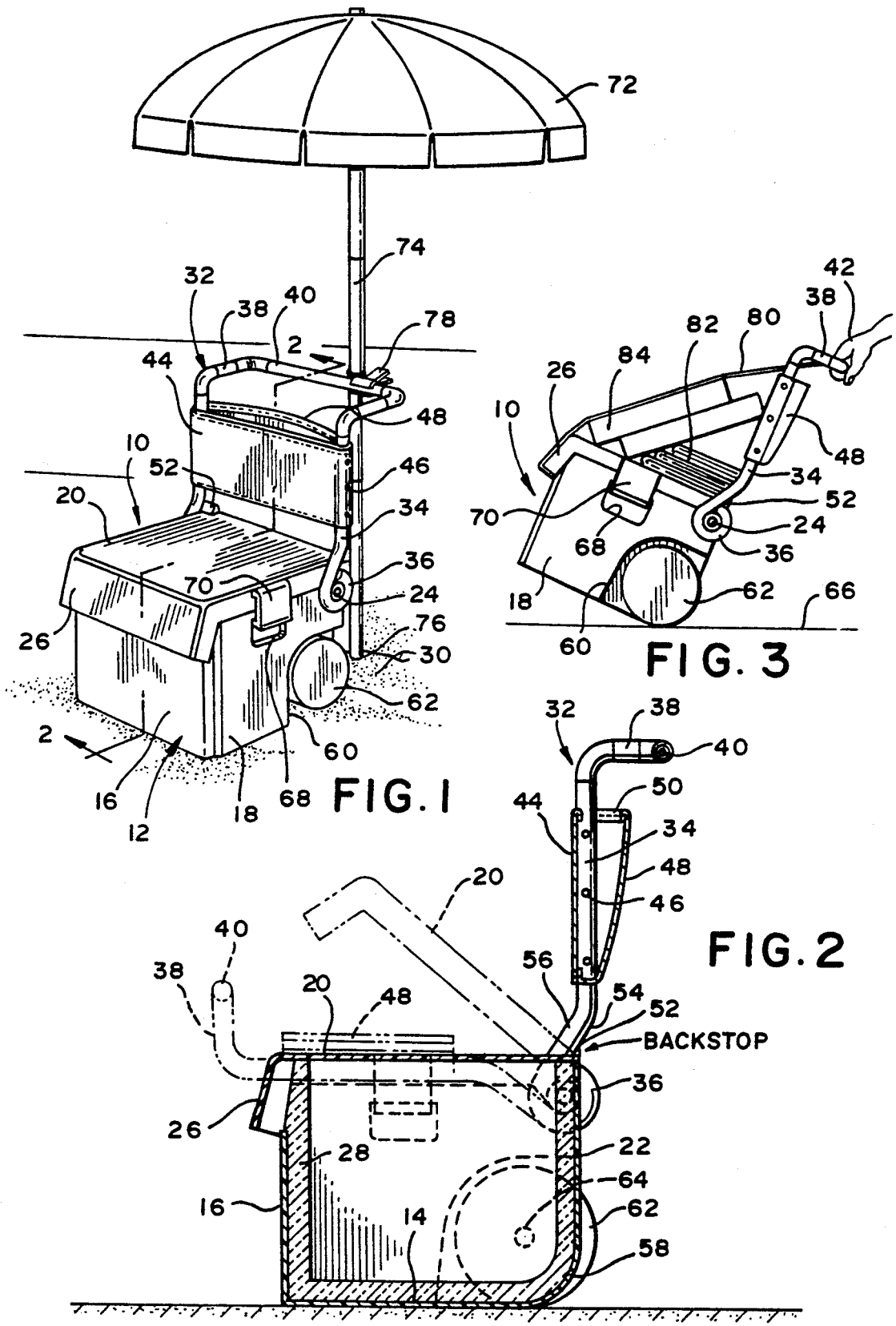

INSULATED BEACH BOX WITH UTILITY ATTACHMENTS

BACKGROUND OF THE INVENTION

1. Field of the Invention

The present invention generally relates to an insulated beach box in the form of an insulated cooler in which ice, beverages and various other food products may be placed with the ice maintaining the beverages and food products in a cold and fresh condition even though the beach box is placed on the beach where it may be relatively hot. The beach box includes structural features and attachments which enables the box to be effectively used as a beach chair having a seat back pivotally connected thereto which forms a seat back and pull handle when oriented generally in perpendicular relation to the top of the box which forms a seat. The box includes wheels and a rounded corner surface generally in alignment with the seat back which enables the device to be easily pulled over a hard surface by using the wheels and over sand, grass and the like by using the curved corner and adjacent surfaces of the box to facilitate the beach box being pulled to a desired site. The seat back includes pockets for storage of various items and is pivotally supported from the box to enable the seat back to be pivoted forwardly to a generally horizontal position to enable the beach box to be carried by the use of end handles. The seat back also provides an effective support for an optional umbrella which can be detachable clamped thereto and enables effective support for various other items that may be carried to or from the beach by placing them against the upper surface of the seat and the front surface of the seat back with such items being strapped in position if desired.

2. Description of the Prior Art

Individuals who go to the beach for swimming, sunbathing and the like frequently carry various items to enhance their enjoyment of beach activities. Such items may include a beach chair, beach umbrella, blanket, towels, radio, an insulated cooler for beverages and food products and various personal items. These items are usually bulky and difficult to handle and control while walking to and from the beach. Some efforts have been made to provide carrying bags and the like for some of the above mentioned items. However, there is still a substantial need for improved devices for use by beach goers to facilitate various utilitarian items being carried to and from the beach.

SUMMARY OF THE INVENTION

An object of the present invention is to provide an insulated beach box with utility attachments which includes an insulated box in the form of a cooler for beverages and food products as a basic unit in which a pivotal lid or cover is provided for the box which also serves as a seat with the box including an upwardly extending seat back at the upper rear corner thereof thereby forming a chair which enables the person to relax in a comfortable manner with the box placed on the sand or other supporting surface.

Another object of the invention is to provide an insulated beach box in accordance with the preceding object in which the bottom rearward corner is curved in a manner that the seat back can be used as a towing handle to pull the beach box along the sand surface somewhat in the nature of a sled with the rear bottom corners of the box also including rotatable wheels having peripheries only slightly projecting beyond the curved rear corner of the box to rolling engage a rigid supporting surface to enable the beach box to be pulled along sidewalks and the like.

A further object of the invention is to provide an insulated beach box in accordance with the preceding objects in which the seat back is pivotally connected to the box for pivotal movement to a collapsed position along the top surface of the box with the seat back including a flexible transverse member extending between parallel side frame members with the flexible member including pockets on the rearward surface thereof to receive various personal items and the like with the seat back also forming a support for an optional umbrella which may be clamped to a frame member forming the seat back.

Still another object of the invention is to provide an insulated beach box with utility attachments which is relatively simple in construction, inexpensive and rugged in construction and which will greatly enhance enjoyment at the beach by enabling various utilitarian features to be incorporated into a device which can be easily transported to and from the beach.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the insulated beach box with utility attachments illustrating the manner of using the device.

FIG. 2 is a vertical sectional view taken substantially upon a plane passing along section line 2—2 on FIG. 1 illustrating the structural details of the invention.

FIG. 3 is a schematic side elevational view illustrating the manner in which the insulated beach box of the present invention is used when being moved.

DESCRIPTION OF THE PREFERRED EMBODIMENT

Referring now specifically to the drawings, the insulated beach box of the present invention is generally designated by reference numeral 10 with FIG. 1 illustrating the device in a typical use and FIG. 3 illustrating the device being moved or transported such as when going to the beach or leaving the beach. The insulated beach box with utility attachments of the present invention includes an insulated cooler generally designated by reference numeral 12 which includes a bottom wall 14, a front wall 16, end walls 18 and lid or top 20 which is pivotally connected to a rear wall 22 by pivot pins or stub shafts 24. The forward end of the lid or cover 20 is downwardly and outwardly inclined at 26 to form a closure for the cooler and enable the lid to be pivoted to an open position as illustrated in broken line in FIG. 2. The wall components and lid of the cooler 12 are provided with insulating material 28 and has water proof surfaces or skins which are rigid and may be decoratively colored as desired with the interior of the cooler adapted to receive ice or other coolant material along with beverages, food items and the like which will be retained in a cold and fresh condition for consumption when desired. The upper surface of the cover or lid 20 provides a seat at a comfortable height for a person sitting upon the lid with their feet engaging the supporting sand surface 30 or the like. The upper surface of the lid may be provided with cushioning material or may be rigid as desired.

Pivotally attached to the upper rear corner of the cooler 12 is a seat back generally designated by reference numeral 32 which includes a pair of side frame members 34 which are generally parallel to each other and provided with a circular eye 36 at the lower end thereof for pivotal mounting on the pivot pin or stub shaft 24 for movement of the seat back 32 from the vertical upright position as illustrated in solid line in FIG. 2 to a collapsed generally horizontal position as illustrated in broken line in FIG. 2. The upper end of the side frame members 34 are provided with laterally extending parallel portions 38 which are interconnected by a handle forming member 40 as illustrated in FIG. 1 which enables a person to grasp the handle member 40 with their hand 42 when transporting the beach box 10 in a manner described hereinafter. Interconnecting the side frame members 34 is a flexible fabric back supporting member 44 which may be constructed of canvas or similar material secured fixedly to the frame members 34 such as by rivets 46 or other fastening means. The flexible member 44 includes a rear compartment or compartments 48 joined at the ends and bottom to the member 44 but provided with an open top area 50 forming an enlarged pocket or pockets in which various personal items may be stored and carried when the beach box is being transported to and from the beach. The rear upper corners of the beach box 10 include a stop 52 rigid with the rear wall 22 of the cooler 12 which engages and forms a stop for the rear surface 54 of an angulated portion 56 at the lower end of the side frame members 34 thus limiting the pivotal movement of the seat back to a generally vertical position in one direction while permitting the seat back to pivot forwardly and downwardly to a horizontal position for storage.

As illustrated in FIG. 2, the rear bottom corner at the juncture between the bottom wall 14 and the rear wall 22 is smoothly and arcuately curved at 58. This curved rear bottom corner of the cooler 12 enables the beach box 10 to be pulled over the sand surface 30 somewhat in the nature of a sled. To further facilitate transport of the beach box, the end walls 18 are provided with bottom rear corner recess areas 60 which receive supporting wheels 62 rotatable supported by axle or pins 64. As illustrated in FIG. 2, the periphery of the wheels 62 projects only slightly beyond the rear corner portions of the insulated cooler 12 which enables the insulated beach box 10 to be rolled along a rigid surface 66 such as a sidewalk or the like with the curved corner surface 58 facilitating movement of the insulated beach box along a sand surface thereby enabling the device to be easily pulled along any type of supporting surface that may be encountered when going to and from the beach.

Each end walls 18 is provided with a recess 68 adjacent the upper ends thereof for engagement by a latch structure formed on or attached to the side edges of the lid 20 with the structure retaining the lid closed and also forming a pair of end handle structures to facilitate the beach box 10 being picked up and handled such as when placing it in or removing it from a vehicle trunk such as when going to or returning from the beach. Also, a beach umbrella 72 may be effectively supported by the seat back 32 with the vertical staff or shank 74 of the umbrella being inserted in the sand surface at 76 and connected to the seat back 32 by a clamp structure 78 which may be a C-clamp or a clothespin type clamp connected to the staff 74 and clamped to the connecting member 40 as illustrated in FIG. 1 thus providing a stable support for the umbrella 72 which will provide sufficient shade for the occupant of the chair seat and back formed by the lid 20 and seat back 32.

FIG. 3 illustrates the manner in which various items may be stored on the lid and retained thereon when the beach box is being moved along a supporting surface. A retaining flexible strap 80 may be connected between the connecting member 40 and the front end of the lid to retain blankets, towels and the like 82 and other items such as pillows 84 or folding beach chairs or any other items which can be snugly retained between the surfaces of the lid 20 and the seat back 32 by a retaining strap, belt or the like.

This structure provides a multipurpose beach chair, umbrella stand, cooler, dolly, carryall and sand sled to facilitate various items being carried to and from the beach or other destination. The device folds into a compact construction which will easily fit into the trunk of an automobile. The curved and sloped smooth surface areas of the cooler enables the device to easily slide across the sand with the wheels being provided to allow easy transport across roads, sidewalks and other hard surfaces. The structure also facilitates the negotiation of stairs and street curbs and the like. The flexible member 34 and the seat back provides comfortable engagement with a person occupying the beach chair and the pocket on the rear surface thereof provides storage area for various relatively small personal items and the like. Also, additional items may be supported on the lid or between the lid and the seat back as illustrated in FIG. 3. The components may be decorative with various color combinations and the like and printed material, indicia, artistic renditions and the like may be placed on various surfaces to enhance the appearance characteristics of the beach chair. This device enables the cooler and the contents thereof to be easily moved to or from a beach site and the seat back and umbrella support enhance the enjoyment of the beach by the person using the insulated beach box with utility attachments of the present invention.

The foregoing is considered as illustrative only of the principles of the invention. Further, since numerous modifications and changes will readily occur to those skilled in the art, it is not desired to limit the invention to the exact construction and operation shown and described,, and,, accordingly, all suitable modifications and equivalents may be resorted to, falling within the scope of the invention.

We claim:

1. An insulated beach box comprising an insulated cooler defined by a peripheral wall with an open top, a top member pivotally connected to said peripheral wall and forming a closure for the cooler and a seat for an occupant, a seat back extending upwardly from said cooler adjacent a rearward edge of said top member to enable an occupant to sit upon the top member and lean rearwardly against said seat back, pivot means interconnecting the lower end of the seat back and the cooler to enable the seat back to be pivoted forwardly and downwardly to a generally horizontal position adjacent the top member, said cooler and seat back including cooperating means to limit the pivotal movement of the seat back to generally an upright, perpendicular relation to the top member, said set back including a transverse top member defining a handle by which the seat back can be grasped and the beach box and seat back pivoted and towed along a support surface, said peripheral wall including a rear wall and a bottom wall generally perpendicular to each other with the juncture between the rear wall and bottom wall being curved smoothly to define a curved surface by which the beach box can slide over and along sand surfaces by tilting the beach box and seat back to a position where the curved juncture between the bottom wall and rear wall of the cooler slidingly engages a sand surface, said peripheral wall including end walls having rotatable wheels stationarily mounted thereon with each of the wheels including a periphery projecting just beyond the curved juncture between the rear wall and bottom wall for engaging hard surfaces over which the beach box is being towed when the beach box and seat back are in tilted position by a person grasping the handle on the seat back and pivoting the seat back rearwardly thus tilting the beach box for support on the wheels.

2. The beach box as defined in claim 1 wherein said wheels are mounted in a fixed position relative to said end walls to enable the beach box to be towed over sand surfaces when in tilted position by the curved juncture supporting the beach box from the sand surface by sliding engagement and also enabling the beach box to be towed over a hard surface when in tilted position by the rotatable wheels supporting the beach box from the hard surface by rolling engagement.

3. The beach box as defined in claim 2 wherein said pivot means includes forwardly offset eye members on a lower end of the seat back, each end wall including an outwardly extending pivot pin at the upper rear corner thereof, said pivot pins being received in said eye members to pivot the seat back to said end walls, said means limiting pivotal movement of the seat back including upwardly and laterally extending stop members rigid with the rear wall of the beach box with the stop members being in the path of movement of the seat back.

4. The beach box as defined in claim 3 wherein said seat back includes a pair of side frame members having said eye members thereon and a transversely extending flexible, fabric like member connected to and extending between the side frame members with the flexible member having substantial vertical height for forming a back engaging and supporting member.

5. The beach box as defined in claim 4 wherein said flexible member includes a vertically opening flexible pocket mounted thereon and oriented rearwardly of the flexible back engaging member to form a pocket for carrying various articles.

6. The beach box as defined in claim 5 together with an umbrella extending downwardly adjacent the seat back and clamp means detachably clamping the umbrella to said transverse top member on said seat back.

* * * * *